United States Patent
Sasaki

(10) Patent No.: US 6,370,781 B1
(45) Date of Patent: Apr. 16, 2002

(54) RECIPROCATING TOOL

(75) Inventor: Yasuo Sasaki, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/438,296

(22) Filed: Nov. 12, 1999

(30) Foreign Application Priority Data

Dec. 4, 1998 (JP) .......................................... 10-344953
Sep. 27, 1999 (JP) .......................................... 11-271722

(51) Int. Cl.⁷ .............................................. B27B 19/04
(52) U.S. Cl. .............................................. 30/392; 78/49
(58) Field of Search .......................... 30/392, 393, 394; 74/49, 50

(56) References Cited

U.S. PATENT DOCUMENTS

| | | | | |
|---|---|---|---|---|
| 2,239,681 A | * | 4/1941 | Marshall ...................... | 30/393 |
| 3,404,574 A | * | 10/1968 | Stelljes ........................... | 74/50 |
| 4,031,763 A | | 6/1977 | Eisenberg ....................... | 74/50 |
| 4,137,632 A | * | 2/1979 | Pfanzer ......................... | 30/393 |
| 4,240,204 A | * | 12/1980 | Walton, II et al. ............. | 30/393 |
| 4,262,421 A | * | 4/1981 | Bergler et al. ................. | 30/393 |
| 4,272,996 A | * | 6/1981 | Sauerwein ..................... | 74/50 |
| 4,512,078 A | * | 4/1985 | Pfanzer ......................... | 30/393 |
| 4,528,753 A | * | 7/1985 | Kuhlmann et al. ........... | 30/392 |
| 4,545,123 A | * | 10/1985 | Hartmann ..................... | 30/393 |
| 4,675,944 A | * | 6/1987 | Wells ........................ | 30/392 X |
| 4,969,270 A | * | 11/1990 | Berghauser et al. ...... | 30/392 X |
| 5,099,705 A | * | 3/1992 | Dravnieks ....................... | 74/50 |
| 5,134,777 A | | 8/1992 | Meyer et al. .................. | 30/392 |
| 5,392,519 A | * | 2/1995 | Inoue et al. .................... | 30/393 |
| RE35,258 E | * | 6/1996 | Palm ............................. | 30/392 |
| 5,581,896 A | | 12/1996 | Yang ............................. | 30/392 |
| 5,607,023 A | * | 3/1997 | Palm ........................ | 30/392 X |
| 5,661,909 A | * | 9/1997 | Kondo et al. .................. | 30/392 |
| 5,755,293 A | * | 5/1998 | Bourke ..................... | 30/392 X |
| 5,765,463 A | * | 6/1998 | Okubo et al. ............. | 30/392 X |
| 5,940,977 A | * | 8/1999 | Moores, Jr. ................... | 30/392 |
| 6,009,627 A | * | 1/2000 | Dassoulas et al. ............ | 30/392 |

FOREIGN PATENT DOCUMENTS

| | | | | |
|---|---|---|---|---|
| CA | 965334 | * | 4/1975 | .................. 30/392 |
| DE | 2747864 | * | 5/1979 | .................. 30/392 |
| JP | 56-110901 | | 8/1981 | |
| JP | 59-176001 | | 10/1984 | |

* cited by examiner

*Primary Examiner*—Charles Goodman
(74) *Attorney, Agent, or Firm*—Louis Woo

(57) ABSTRACT

A reciprocating tool includes a rotatable drive gear. A pin connected to the drive gear is eccentric with respect to an axis of rotation of the drive gear. A plunger extending perpendicular to the pin is movable upward and downward. A connector fixed to the plunger engages the pin. A cam is provided with the pin at an eccentric position. A cam holding member has an eccentric recess accommodating at least part of the cam. The cam holding member is connected to the drive gear for rotation responsive to rotation of the drive gear. A first engagement portion is provided on the cam. A second engagement portion is provided on the cam holding member. The second engagement portion is engageable with the first engagement portion. Engagement between the first engagement portion and the second engagement portion can be canceled to allow rotation of the cam relative to the cam holding member. It is possible to establish engagement between the first engagement portion and the second engagement portion while holding the cam at an angular position which occurs as a result of the rotation of the cam.

8 Claims, 10 Drawing Sheets

RECIPROCATING TOOL

BACKGROUND OF THE INVENTION

1. Field of the Invention

This invention generally relates to a reciprocating tool. This invention specifically relates to a power tool for reciprocating a cutting blade. Examples of the power tool are a jigsaw and a saber saw.

2. Description of the Related Art

U.S. Pat. No. 4,031,763 discloses a reciprocating power tool in which the length of the stroke of the tool member can be adjusted. The tool in U.S. Pat. No. 4,031,763 includes a screw adjustment member having a hand knob. The screw adjustment member is mounted in the tool housing. When the screw adjustment member is rotated, it changes the position of one end of a first lever. The other end of the first lever bears against a rotating member which is mounted on the power output shaft of the tool. As the rotating member is adjusted, it causes a second lever to rotate and thereby changes the position of the arm of the reciprocating mechanism with respect to the shaft of the power drive means. Thus, as the knob on the screw adjustment member is rotated, the swing arm length of the eccentric driven by the power source may be varied.

U.S. Pat. No. 5,134,777 discloses an adjustable stroke reciprocating mechanism for a power tool. According to U.S. Pat. No. 5,134,777, the ram of the reciprocating saw is driven by a scotch yoke mechanism. A planetary gear system consisting of a ring gear and an idler gear imparts an elliptical or linear path of movement to the pin forming part of the scotch yoke mechanism. The ring gear may be adjustably positioned for changing its relationship relative to the idler gear, thereby varying the orientation of the elliptical or linear path of movement of the drive pin for varying the stroke of reciprocation of the ram which is connected to the saw blade holder. Actuation of the ring gear to its desired position automatically causes the foot plate of the saw to be located in its desired position for the selected stroke of movement. The idler gear has an eccentric pin which fits into a slot in the ram. As the ring gear is rotated, an angular position of the idler gear changes so that the stroke of reciprocation of the ram varies.

U.S. Pat. No. 5,581,896 discloses a reciprocating action tool having a stroke adjusting mechanism. The tool in U.S. Pat. No. 5,581,896 includes a disc rotatably received in a housing, and a shaft slidably engaged in the upper portion of the housing. The disc includes a bolt rotatably engaged in a groove and a slide threadedly engaged with the bolt. The slide includes a stud for rotatably supporting a follower which is slidably engaged with the shaft. The slide is moved longitudinally along the groove so as to adjust a moving stroke and a moving speed of the shaft. The shaft is moved quickly for driving a cutting tool and is moved slowly for moving a saw blade or a file.

Japanese published unexamined patent application 59-176001 discloses a jigsaw including a reciprocation stroke varying mechanism via which a power source and a saw blade are connected. The reciprocation stroke varying mechanism includes a cam rod, and a drive shoe with which the cam rod is in engagement. The inclination angle of the drive shoe is variable.

SUMMARY OF THE INVENTION

It is an object of this invention to provide an improved reciprocating tool.

A first aspect of this invention provides a reciprocating tool comprising a rotatable drive gear; a pin connected to the drive gear and being eccentric with respect to an axis of rotation of the drive gear; a plunger extending perpendicular to the pin and being movable upward and downward; a connector engaging the plunger and the pin; a cam provided with the pin at an eccentric position; a cam holding member holding the cam at an eccentric position and being connected to the drive gear for rotation responsive to rotation of the drive gear; a first engagement portion provided on the cam; a second engagement portion provided on the cam holding member and being engageable with the first engagement portion; first means for cancelling engagement between the first engagement portion and the second engagement portion to allow rotation of the cam relative to the cam holding member; and second means for establishing engagement between the first engagement portion and the second engagement portion while holding the cam at an angular position which occurs as a result of the rotation of the cam.

A second aspect of this invention is based on the first aspect thereof, and provides a reciprocating tool wherein the cam holding member having an eccentric recess accommodating at least part of the cam, and the cam holding member and the drive gear are integral with each other.

A third aspect of this invention is based on the first aspect thereof, and provides a reciprocating tool wherein the first engagement portion includes a projection, and the second engagement portion includes a recess into which the projection is movable.

A fourth aspect of this invention is based on the first aspect thereof, and provides a reciprocating tool wherein the first engagement portion includes a plurality of first sub engagement portions spaced at equal angular intervals, and the second engagement portion includes a plurality of second sub engagement portions spaced at equal angular intervals and being engageable with the first sub engagement portions respectively.

A fifth aspect of this invention is based on the first aspect thereof, and provides a reciprocating tool further comprising a weight provided on the cam and having a mass substantially equal to that of the pin, and a position of the weight and a position of the pin are symmetrical with respect to a central axis of the cam. A sixth aspect of this invention is based on the first aspect thereof, and provides a reciprocating tool further comprising a counter rack substantially equal in mass to the plunger, and means for moving the counter rack in a direction opposite to a direction of movement of the plunger.

A seventh aspect of this invention is based on the first aspect thereof, and provides a reciprocating tool wherein the drive gear includes a normal-speed gear and a high-speed gear, and further comprising means for selectively connecting the cam holding member with one of the normal-speed gear and the high-speed gear.

An eighth aspect of this invention is based on the seventh aspect thereof, and provides a reciprocating tool wherein the plunger reciprocates as the drive gear rotates in cases where the first engagement portion and the second engagement portion are in engagement with each other, and a stroke of the plunger depends on an angular position of the cam relative to the cam holding member, and wherein the cam holding member is connected with the high-speed gear when the stroke of the plunger is set to a first value, and is connected with the normal-speed gear when the stroke of the plunger is set to a second value greater than the first value.

A ninth aspect of this invention provides a reciprocating tool comprising a drive member rotatable about its axis; a cam eccentrically connected to the drive member for rotation responsive to rotation of the drive member; a plunger; a cam follower fixed to the plunger and engaging the cam for reciprocating the plunger as the cam rotates, wherein a stroke of reciprocation of the plunger depends on an angular position of the cam relative to the drive member; means for changing the angular position of the cam relative to the drive member to vary the stroke of reciprocation of the plunger; and a bearing provided between the cam and the cam follower.

A tenth aspect of this invention is based on the ninth aspect thereof, and provides a reciprocating tool wherein the cam has a pin at its eccentric position, and the cam follower has a groove into which the pin extends, and wherein the bearing is located between the cam follower and the pin in the groove.

DESCRIPTION OF THE PREFERRED EMBODIMENTS

The prior-art jigsaw disclosed in Japanese published unexamined patent application 59-176001 will be explained below for a better understanding of this invention.

Figure 1:
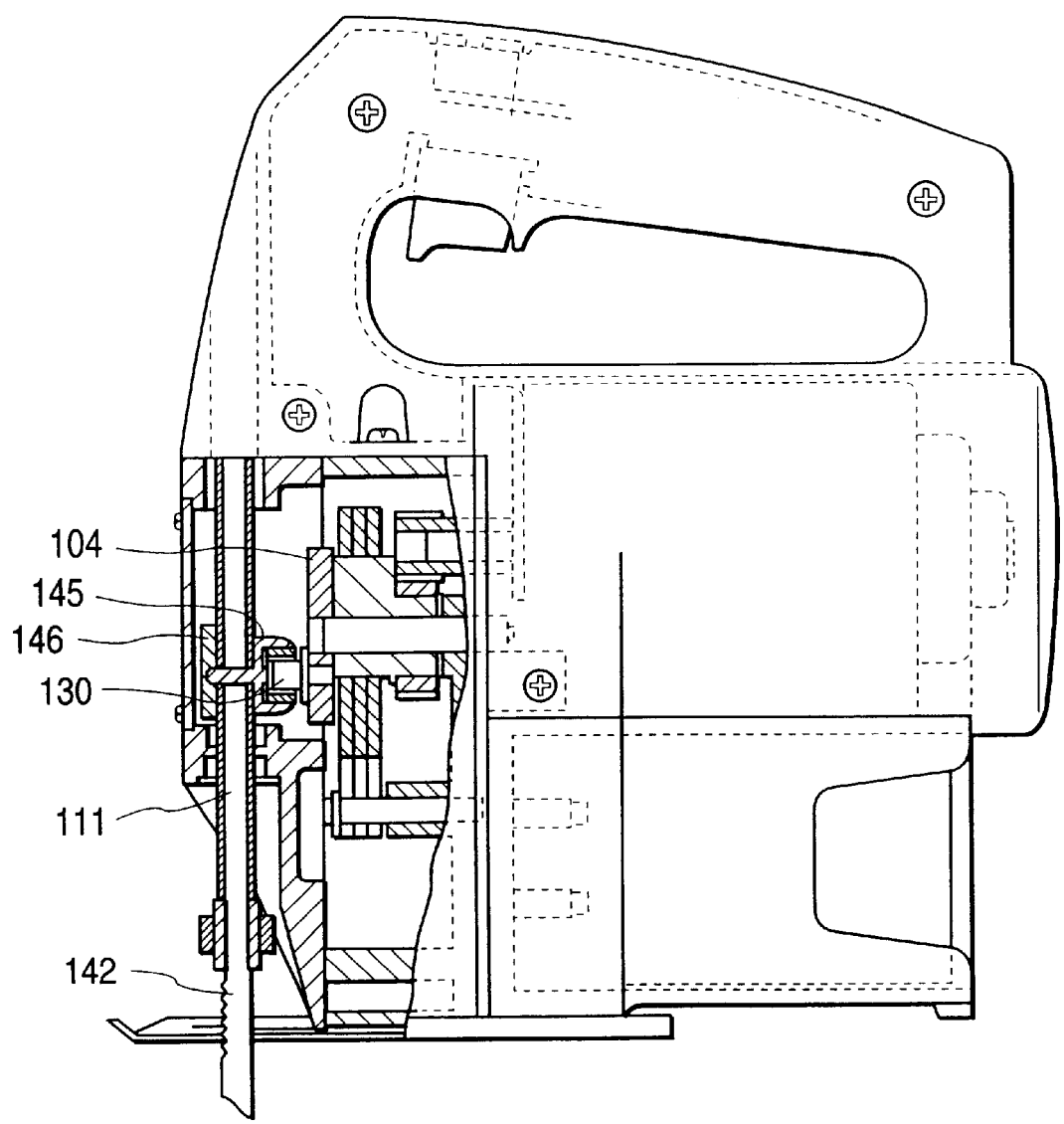
FIG. 1 is a side view, partially in section, of a prior-art jigsaw.

FIG. 1 shows the prior-art jigsaw which includes a gear 104 rotated by a motor (not shown). A cam pin or a cam rod 130 is attached off-center to the gear 104. The cam pin 130 engages a connector (a drive shoe) 145 attached to a plunger 111. The connector 145 acts as a cam follower for the cam pin 130. The connector 145 has a groove into which the cam pin 130 slidably fits. The cam pin 130 rotates together with the gear 104. The connector 145 and the plunger 111 reciprocate or periodically move upward and downward in accordance with the rotation of the cam pin 130. A cutting blade 142 attached to a lower end of the plunger 111 also reciprocates.

Figure 2:
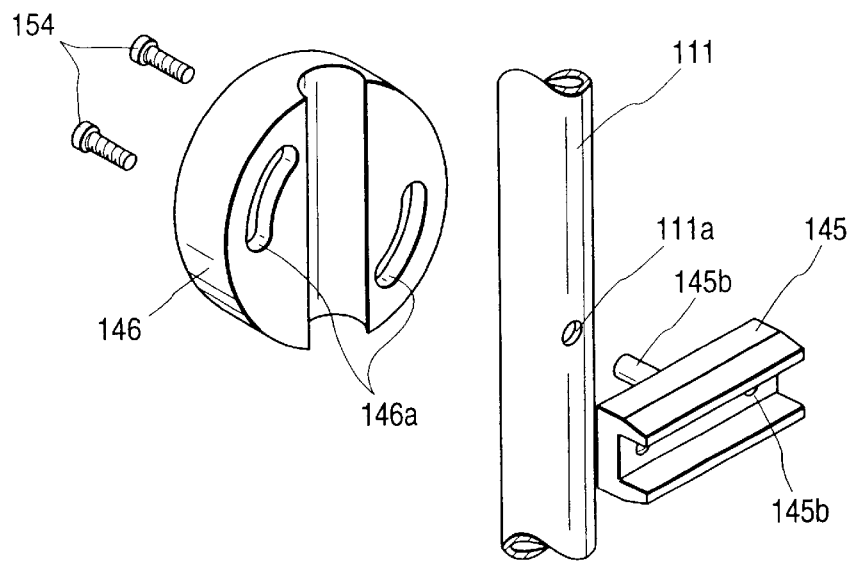
FIG. 2 is an exploded view of a portion of the prior-art jigsaw in FIG. 1.

As shown in FIG. 2, a central portion of the connector 145 has a shaft 145a fitting into a hole 111a in the plunger 111. Opposite end portions of the connector 145 have threaded holes 145b respectively. A connector holder 146 has circumferentially-extending guide holes 146a through which screws 154 pass respectively. The connector holder 146 has a recess into which the plunger 111 fits. The connector 145 and the connector holder 146 are placed at opposite sides of the plunger 111 respectively. Heads of the screws 154 engage the connector holder 146 while ends of the screws 154 extend into the threaded holes 145b and hence engage the connector 145. As a result, the connector 145 is mounted on the plunger 111.

Figure 3:
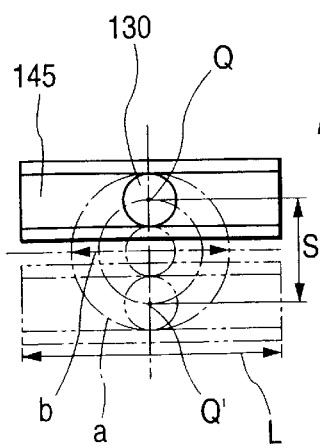
FIGS. 3, 4, and 5 are diagrams of a connector and a pin in the prior-art jigsaw of FIG. 1 which are in different positional conditions respectively.
Figure 4:
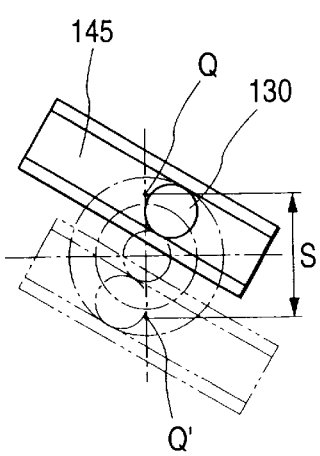
Figure 5:
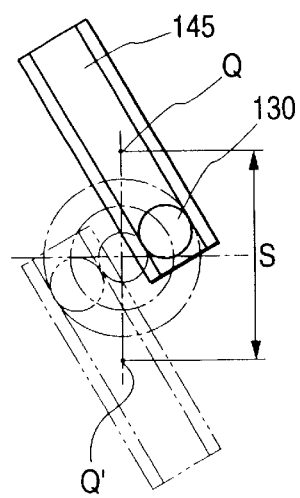

The angle of the connector 145 relative to the plunger 111 can be varied as shown in FIGS. 3, 4, and 5. Specifically, in the case where the screws 154 are loosened, the connector 145 can be rotated about the shaft 145a relative to the plunger 111. The screws 154 move along the guide holes 146a in the connector holder 146 while the connector 145 is rotated relative to the plunger 111. After the connector 145 reaches a desired angular position, the screws 154 are tightened again. As previously mentioned, the connector 145 periodically moves upward and downward in accordance with the rotation of the cam pin 130. In each of FIGS. 3, 4, and 5, an uppermost position of the connector 145 is shown by solid lines while a lowermost position thereof is shown by broken lines. In each of FIGS. 3, 4, and 5, the letter Q denotes the center of the shaft 145a of the connector 145 and the center of the hole 111a in the plunger 111 which occur when the connector 145 assumes its uppermost position. On the other hand, the letter Q' denote the center of the shaft 145a of the connector 145 and the center of the hole 111a in the plunger 111 which occur when the connector 145 assumes its lowermost position. In each of FIGS. 3, 4, and 5, the letter S denotes the distance between the point Q and the point Q', that is, the stroke of the reciprocation of the plunger 111 (the stroke of the reciprocation of the connector 145).

When the angle of the connector 145 relative to the plunger 111 is 90° degrees as shown in FIG. 3, the stroke S is minimized. As the angle of the connector 145 relative to the plunger 111 decreases from 90° degrees, the stroke S increases (see FIGS. 4 and 5). Thus, the stroke S can be varied in accordance with the angle of the connector 145 relative to the plunger 111.

In the prior-art jigsaw of FIGS. 1–5, it is necessary that the length of the connector 145 along the longitudinal direction is significantly greater than the diameter "b" of the outer circle "a" formed by the cam pin 130 during its relative rotation. In addition, it is necessary to provide a large space which allows the rotation of the connector 145 relative to the plunger 111. Therefore, the prior-art jigsaw of FIGS. 1–5 tends to be large in size. The connector 145 is relatively heavy since its length is great. Thus, the weight of a balancer acting against the connector 145 is great. Accordingly, the prior-art jigsaw of FIGS. 1–5 tends to be relatively heavy.

In the prior-art jigsaw of FIGS. 1–5, change of the stroke S requires the following steps. First, a cover or a housing is removed to expose the connector 145. The screws 154 are loosened. Then, the connector 145 is rotated relative to the plunger 111 while the screws 154 are slid along the guide holes 146a in the connector holder 146. Subsequently, the screws 154 are tightened. Lastly, the cover or the housing is placed in position. Therefore, it is troublesome to change the stroke S.

In the prior-art jigsaw of FIGS. 1–5, the balancer which acts against the connector 145 remains positionally unchanged even when the angle of the connector 145 relative to the plunger 111 is changed. Desired action of the balancer depends on the angle of the connector 145. Accordingly, it is difficult to always optimize action of the balancer independent of the angle of the connector 145 relative to the plunger 111.

In the prior-art jigsaw of FIGS. 1–5, a mean speed of reciprocation of the plunger 111 is relatively low when the stroke S is set to a small value. Therefore, the efficiency of work done by the prior-art jigsaw of FIGS. 1–5 tends to be low in the case where the stroke S is small.

First Embodiment

Figure 6:
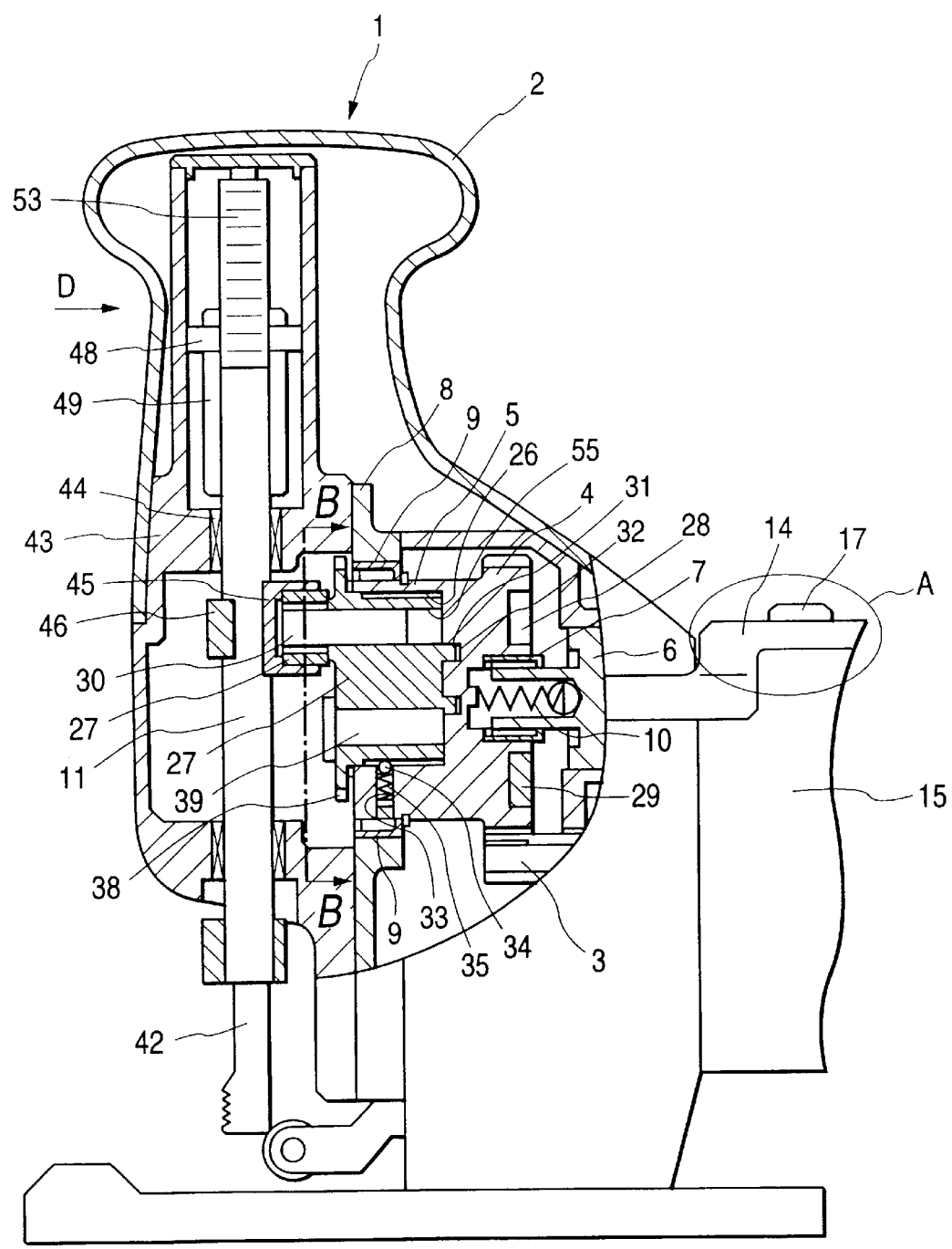
FIG. 6 is a side view, partially in section, of a reciprocating tool according to a first embodiment of this invention.

FIG. 6 shows a reciprocating tool according to a first embodiment of this invention. The reciprocating tool of FIG. 6 is designed as a jigsaw. With reference to FIG. 6, the reciprocating tool includes a body 1 in which a motor (not shown) is contained. The drive force generated by the motor is transmitted via an armature pinion 3 to a gear 4 integral and coaxial with a cam accommodating portion or a cam holding portion 5. The gear 4 and the cam accommodating portion (the cam holding portion) 5 are supported in a gear cover 2 by bearings 7 and 9. The gear 4 and the cam accommodating portion 5 can rotate about their axes. The gear 4 and the cam accommodating portion 5 can slide in the axial direction. The bearing 7 is connected to a spindle 6 screwed and fixed within the gear cover 2. The bearing 9 is fitted into a second cover 8 by a pressing process. A spring 10 disposed in the spindle 6 urges the gear 4 and the cam accommodating portion 5 toward a plunger 11.

Figure 7:
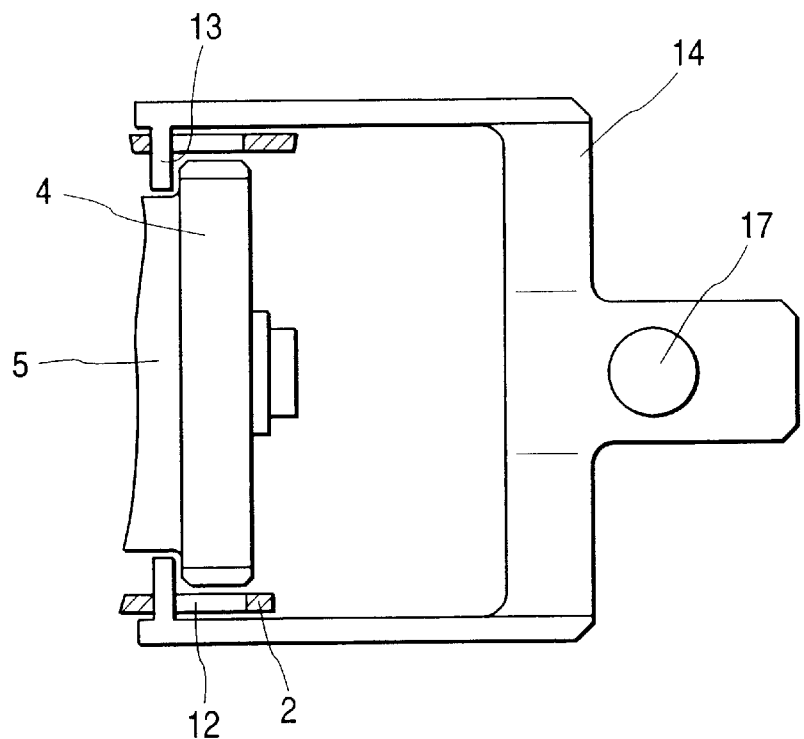
FIG. 7 is a plan view of a portion of the reciprocating tool in FIG. 6.

As shown in FIG. 7, the gear cover 2 has windows 12 near the gear 4. The windows 12 are in left-hand and right-hand places symmetrical with each other. The windows 12 extend in directions parallel to the axis of the gear 4. An approximately U-shaped lever 14 has two lever pins 13 which slidably extend through the respective windows 12 toward the gear 4. The windows 12 allow movement of the lever pins 13 and the lever 14 along directions parallel to the axis of the gear 4. The lever pins 13 can meet walls of the gear 4. In the case where the lever pins 13 and the lever 14 are moved rightward as viewed in FIG. 7, the lever pins 13 meet the gear 4 and then the gear 4 and the cam accommodating portion 5 are moved rightward together with the lever pins 13. In the case where the lever pins 13 and the lever 14 are moved leftward as viewed in FIG. 7, the gear 4 and the cam accommodating portion 5 move leftward due to the spring 10 while following the lever pins 13.

Figure 8:
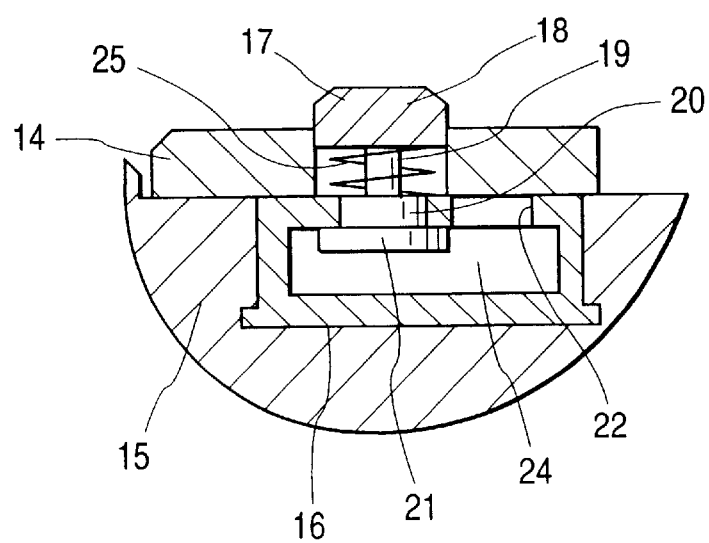
FIG. 8 is a sectional view of the portion "A" of the reciprocating tool in FIG. 6.

With reference to FIGS. 7 and 8, an end of the lever 14 which is remote from the lever pins 13 has a button 17. The end of the lever 14 is connected to an upper portion of a housing 15 via the button 17.

As shown in FIG. 8, the button 17 has a press portion (a contact portion) 18, a smaller-diameter portion 19, an intermediate-diameter portion 20, and a larger-diameter portion 21. A box 16 for holding the end of the lever 14 is connected to the upper portion of the housing 15.

Figure 9:
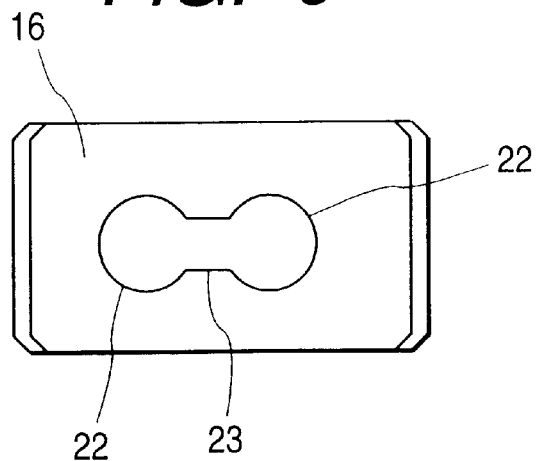
FIG. 9 is a top view of a box in FIG. 8.

With reference to FIGS. 8 and 9, an upper portion of the box 16 is formed with two through holes 22 having a diameter slightly greater the outside diameter of the intermediate-diameter portion 20 of the button 17. The through holes 22 are side-by-side in a direction along which the lever 14 slides. The upper portion of the box 16 has a passage 23 extending between the through holes 22. The passage 23 is slightly greater in size than the outside diameter of the smaller-diameter portion 19 of the button 17. The passage 23 is smaller in size than the outside diameter of the intermediate-diameter portion 20 of the button 17. A central portion of the box 16 has a space 24 for accommodating the larger-diameter portion 21 of the button 17.

A spring 25 provided between the press portion 18 of the button 17 and the walls of the box 16 urges the button 17 upward. Normally, the button 17 is in an uppermost position by the force of the spring 25, and the intermediate-diameter portion 20 of the button 17 is in one of the through holes 22 so that the lever 14 is substantially inhibited from sliding. When the button 17 is depressed toward the box 16 and is moved to a lowermost position, the smaller-diameter portion 19 of the button 17 is in one of the through holes 22. In this case, the lever 14 can be slid in the direction parallel to the axis of the gear 4 by forcing the button 17 to move the smaller-diameter portion 19 of the button 17 from one of the through holes 22 to the other via the passage 23.

With reference back to FIG. 6, a surface of the cam accommodating portion 5 which faces the plunger 11 has an eccentric recess or hole 26 off-center with respect to the axis of the gear 4. A cam 27 has a portion whose external shape is approximately similar to the shape of the eccentric recess 26. This portion of the cam 27 slidably extends into the eccentric recess 26. Accordingly, the cam 27 is eccentric with respect to the cam accommodating portion 5 and also the gear 4. A surface of the gear 4 which faces the spindle 6 has grooves 28. A weight 29 fits into one of the grooves 28 which is in a position 180-degree opposite to the eccentric recess 26 with respect to the axis of the gear 4. The weight 29 is fixed to the gear 4.

Figure 10:
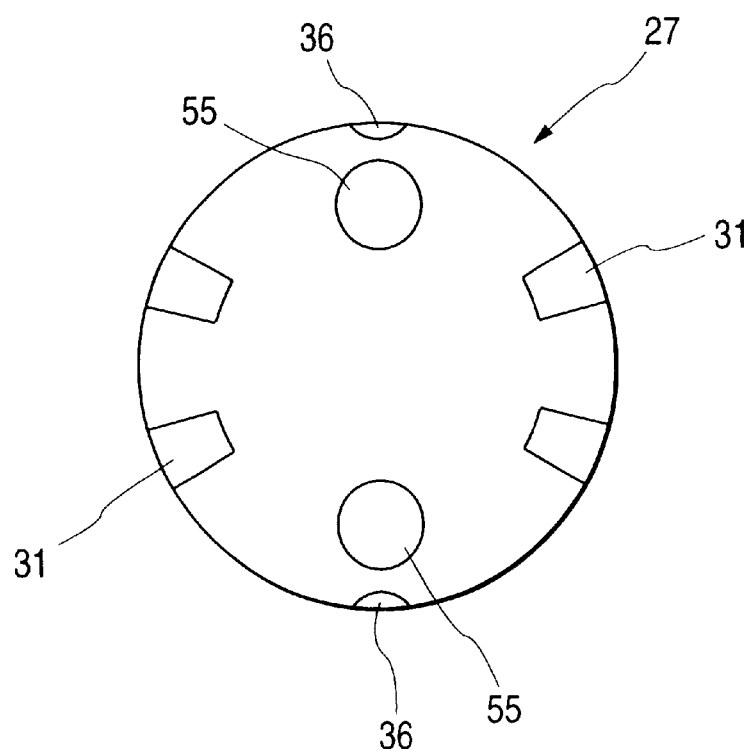
FIG. 10 is a side view of a cam in FIG. 6.

As shown in FIGS. 6 and 10, the cam 27 has two off-center through holes 55 at positions symmetrical with respect to the axis thereof. A cam pin 30 fitting into one of the through holes 55 projects toward the plunger 11. The cam pin 30 is fixed to the cam 27. A weight 39 which will be mentioned later fits into the other through hole 55. Thus, the position of the weight 39 and the position of the cam pin 30 are symmetrical with respect to the axis of the cam 27. The weight 39 is fixed to the cam 27. A portion of the cam 27 which is located in the cam accommodating portion 5 has four axial projections 31 at positions symmetrical with respect to the axis of the cam 27. A part of the cam accommodating portion 5 which defines a bottom of the eccentric recess 26 has four recesses 32 into which the projections 31 of the cam 27 fit respectively under normal conditions. Thus, the cam 27 and the cam accommodating portion 5 can be in engagement with each other. When the cam 27 and the cam accommodating portion 5 are in engagement with each other via the projections 31 and the recesses 32, the cam 27 is prevented from rotating relative to the cam accommodating portion 5. In this case, the cam 27 rotates together with the gear 4 and the cam accommodating portion 5.

A thick-wall part of the cam accommodating portion 5 which is near the eccentric recess 26 has a hole 33 extending along a direction perpendicular to the axis of the cam 27. At least part of a ball 34 is located in the hole 33. A compression spring 35 is disposed in the hole 33. The spring 35 urges the ball 34 toward the eccentric recess 26. An outer circumferential surface of the cam 27 has two grooves 36 at diametrically-opposed positions (that is, positions symmetrical with respect to the axis of the cam 27) respectively. Each of the grooves 36 has a shape corresponding to a part of a sphere. Under normal conditions, the ball 34 fits into one of the grooves 36, thereby preventing the cam 27 from rotating relative to the cam accommodating portion 5 even in the case where the cam 27 and the cam accommodating portion 5 are out of engagement via the projections 31 and the recesses 32.

A bearing 37 is connected to an end of the cam pin 30. As previously mentioned, the cam pin 30 fits into one of the through holes 55 in the cam 27. The cam pin 30 engages a connector (a drive shoe) 45 via the bearing 37. The connector 45 is fixed to the plunger 11. The connector 45 has a U shape with a groove extending perpendicular to the longitudinal axis of the plunger 11. The bearing 37 and the end of the cam pin 30 extend into the groove in the connector 45. The connector 45 acts as a cam follower for the cam pin 30. As previously mentioned, the weight 39 fits into the other through hole 55 in the cam 27. The weight 39 is fixed to the cam 27. The weight 39 is made of copper. The mass of the weight 39 is substantially equal to that of the cam pin 30. Preferably, the mass of the weight 39 is approximately equal to the sum of the mass of the cam pin 30 and the mass of the bearing 37.

Figure 11:
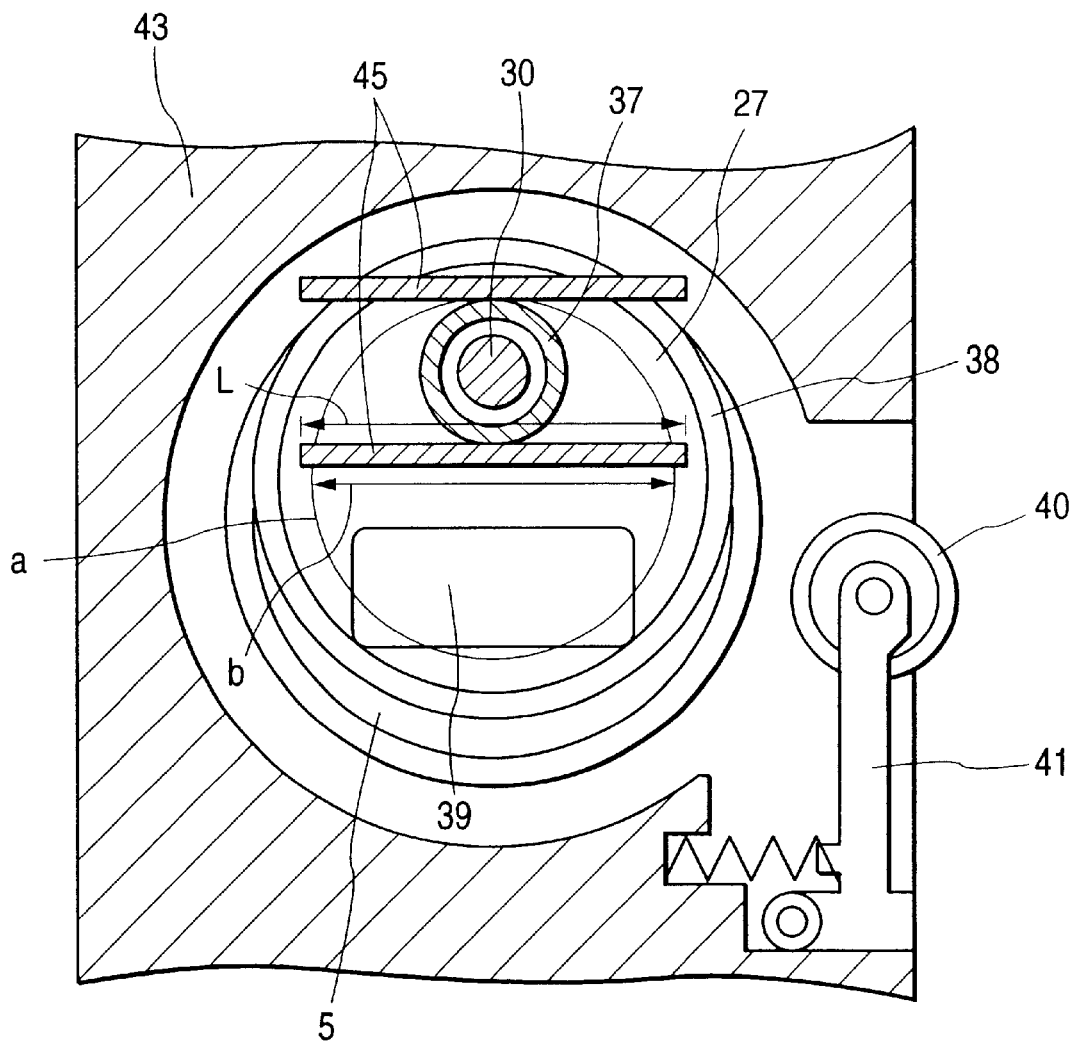
FIG. 11 is a sectional view taken along the line B—B in FIG. 6.

As shown in FIGS. 6 and 11, a part of the cam 27 which projects from the cam accommodating portion 5 has teeth 38 extending radially outward. A manually-operated gear 40 which can mesh with the teeth 38 on the cam 27 is rotatably supported by an arm 41 connected to an upper cover 43. The arm 41 can be rotated relative to the upper cover 43. The rotation of the arm 41 allows movement of the gear 40 into and out of mesh with the teeth 38 on the cam 27. Normally, a spring (no reference character) provided between the arm 41 and the upper cover 43 holds the arm 41 in a position where the gear 40 is separate from the teeth 38 on the cam 27. Preferably, the upper cover 43 has an opening which allows user's finger (operator's finger) to access the gear 40. This opening can be covered by a suitable member.

A cutting blade 42 can be attached to an end of the plunger 11. The plunger 11 is held by two supporting devices 44 provided on an upper portion and a lower portion of the upper cover 43 respectively. The plunger 11 can slide relative to the upper cover 43 in an upward direction and a downward direction. In other words, the plunger 11 can move in two opposite directions along its longitudinal axis. As previously mentioned, the connector 45 is of a U shape with a groove extending perpendicular to the longitudinal axis of the plunger 11. A connector holder 46 firmly attaches the connector 45 to a portion of the plunger 11 between the supporting devices 44. The connector 45 is designed to convert rotation of the gear 4 into reciprocating motion. The connector 45 has an upper wall and a lower wall connected by a side wall. The bearing 37 is located between the upper wall and the lower wall of the connector 45. The cam pin 30 extends into the bearing 37. The cam pin 30 engages the connector 45 via the bearing 37. The bearing 37 allows the cam pin 30 to rotate relative to the connector 45. In addition, the bearing 37 allows the cam pin 30 to relatively move along the groove in the connector 45 as the cam pin 30 rotates together with the cam 27. The bearing 37 remains in contact with the upper wall and the lower wall of the connector 45. The cam pin 30 rotates together with the cam 27, the cam accommodating portion 5, and the gear 4. The engagement between the cam pin 30 and the connector (the cam follower) 45 causes the connector 45 to be reciprocated as the cam pin 30 rotates together with the cam 27. During the reciprocation of the connector 45, the bearing 37 and the related end of the cam pin 30 relatively move along the groove in the connector 45. Specifically, the bearing 37 slides along the groove in the connector 45. The plunger 11 reciprocates together with the connector 45. In other words, the plunger 11 periodically moves upward and downward together with the connector 45.

In this case, the stroke of reciprocation of the plunger 11 is equal to the distance between the center of rotation of the gear 4 (that is, the axis of the gear 4) and the center of the cam pin 30 which depends on the angular position of the cam 27 relative to the cam accommodating portion 5 and the gear 4. Therefore, the stroke of reciprocation of the plunger 1 can be changed by varying the angular position of the cam 27 relative to the cam accommodating portion 5 (and the gear 4). As will be made clear later, the cam 27 can be locked to any one of different angular positions relative to the cam accommodating portion 5. Accordingly, the stroke of reciprocation of the plunger 11 can be changed among different values. The locked angular position of the cam 27 relative to the cam accommodating portion 5 is determined by which of the grooves 36 the ball 34 fits into. Thus, the stroke of reciprocation of the plunger 11 depends on which of the grooves 36 the ball 34 fits into.

Figure 12:
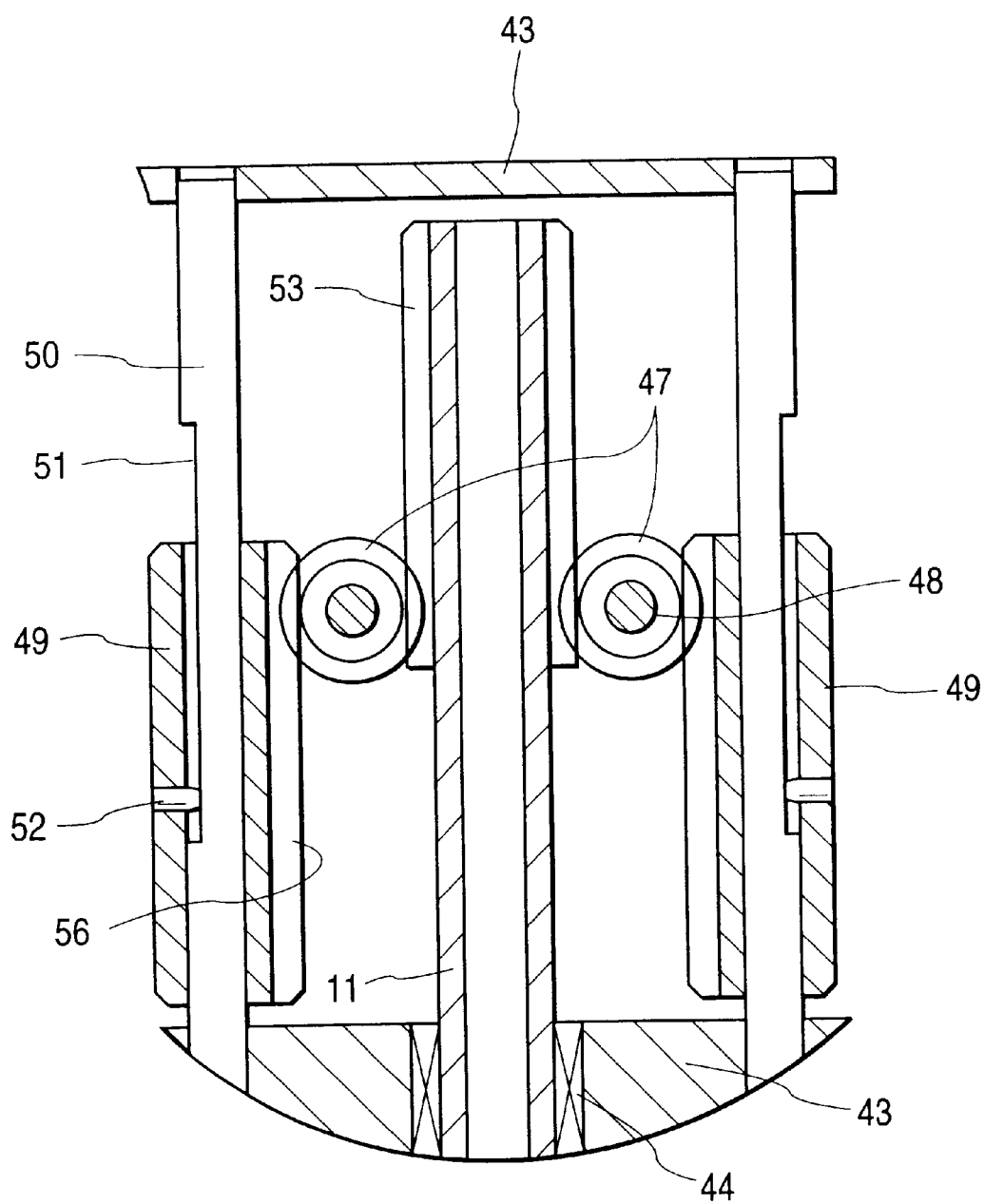
FIG. 12 is a sectional view, in the direction of the arrow D, of an upper portion of a plunger and related members in FIG. 6.

As shown in FIGS. 6 and 12, two opposite outer surfaces of an upper portion of the plunger 11 have racks 53 respectively. The racks 53 mesh with pinions 47 which are rotatably mounted on shafts 48, respectively. The shafts 48 are provided on the upper cover 43. Two rods 50 are provided in the upper cover 43. The rods 50 support counter racks 49 respectively in a manner such that the counter racks 49 can move upward and downward. The counter racks 49 extend in directions parallel to the longitudinal axis of the plunger 11. The counter racks 49 have teeth 56 which mesh with the pinions 47 respectively. The plunger 11 is located between the rods 50.

As the plunger 11 moves upward, the racks 53 on the upper portion of the plunger 11 cause the pinions 47 to rotate in first directions. The rotation of the pinions 47 moves the counter racks 49 downward. On the other hand, as the plunger 11 moves downward, the racks 53 cause the pinions 47 to rotate in second directions opposite to the first directions. The rotation of the pinions 47 moves the counter racks 49 upward. The relation between the counter racks 49 and the pinions 47 is designed so that the counter racks 49 will assume their bottom dead centers when the plunger 11 reaches its top dead center. The sum of the masses of the two counter racks 49 is substantially equal to the mass of the plunger 11. Preferably, the sum of the masses of the two counter racks 49 is approximately equal to the sum of the masses of the plunger 11, the cutting blade 42, the connector 45, and the connector holder 46. The counter racks 49 move in directions opposite to the direction of movement of the plunger 11. The speed of movement of the counter racks 49 is equal to that of the plunger 11. Therefore, the counter racks 49 suppress or prevent unwanted axial vibration of the plunger 11 during normal reciprocation of the plunger 11.

As shown in FIG. 12, the rods 50 have flat portions 51 respectively. Guide pins 52 fit into holes in the counter racks 49 respectively. The guide pins 52 are fixed to the counter racks 49 respectively. The guide pins 52 extend in directions perpendicular to the axes of the rods 50. Ends of the guide pins 52 are continuously in contact with the flat portions 51 of the rods 50 respectively. The engagement between the guide pins 52 and the flat portions 51 prevents the counter racks 49 from rotating.

The reciprocating tool of FIGS. 6–12 operates as follows. When a power supply switch (not shown) is changed to an on position, the motor (not shown) is powered so that the motor rotates the armature pinion 3, the gear 4, and the cam accommodating portion 5. Under normal conditions, since the cam accommodating portion 5 and the cam 27 are in engagement via the projections 31 and the recesses 32, the cam 27 rotates together with the cam accommodating portion 5. In addition, the cam pin 30 rotates together with the cam 27. The force is transmitted from the cam pin 30 to the plunger 11 via the bearing 37 and the connector 45. The combination of the cam pin 30, the bearing 37, and the connector (the cam follower) 45 converts the force into a reciprocating force. The reciprocating force periodically moves the plunger 11 upward and downward. The cutting blade 42 moves upward and downward together with the plunger 11. The stroke of reciprocation of the plunger 11 is equal to the distance between the center of rotation of the gear 4 (that is, the axis of the gear 4) and the center of the cam pin 30. In the case where the reciprocating tool is in a position shown in FIG. 6, the stroke of reciprocation of the plunger 11 is relatively large.

Since the counter racks 49 are connected with the plunger 11 via the pinions 47 and the racks 53, the counter racks 49 move as the plunger 11 moves. The direction of movement of the counter racks 49 is opposite to that of the plunger 11. In addition, the speed of movement of the counter racks 49 is equal to that of the plunger 11. The sum of the masses of the two counter racks 49 is approximately equal to the sum of the masses of the plunger 11, the cutting blade 42, the connector 45, and the connector holder 46. Therefore, the counter racks 49 suppress or prevent unwanted axial vibration of the plunger 11 during normal reciprocation of the plunger 11. The masses of the weights 29 and 39 are chosen to suppress or prevent unwanted vibration of the cam 27 and the cam accommodating portion 5 in the direction of rotation thereof.

The stroke of reciprocation of the plunger 11 can be changed as follows. The motor (not shown) is deactivated. Then, the button 17 on the lever 14 is depressed from a position shown in FIG. 8. While the button 17 remains depressed, the lever 14 is moved away from the plunger 11 and the smaller-diameter portion 19 of the button 17 is moved from first one of the through holes 22 to second one via the passage 23. Then, the button 17 is released from the depression force. The spring 25 forces the intermediate-diameter portion 20 of the button 17 into the second through hole 22. Thus, the button 17 and the lever 14 fall into engaged states. As the lever 14 is moved away from the plunger 11, the pins 13 on the lever 14 meet the gear 4 and then the gear 4 and the cam accommodating portion 5 are moved toward the housing 15 together with the lever pins 13. Therefore, the projections 31 on the cam 27 move out of the recesses 32 in the cam accommodating portion 5 so that the cam 27 and the cam accommodating portion 5 disengage from each other.

While the cam 27 and the cam accommodating portion 5 remain out of engagement via the projections 31 and the recesses 32, the gear 40 (see FIG. 11) is pressed by user's finger into mesh with the teeth 38 on the cam 27. The gear 40 is rotated by user's finger while the gear 40 and the teeth 38 are held in mesh. The teeth 38 and the cam 27 rotate relative to the cam accommodating portion 5 in accordance with the rotation of the gear 40. As the cam 27 rotates relative to the cam accommodating portion 5 through an angle of 180 degrees, the ball 34 moves out of first one of the grooves 36 and then falls into second one of the grooves 36. Then, the button 17 on the lever 14 is depressed. While the button 17 remains depressed, the lever 14 is returned to the original position shown in FIG. 8. As the lever 14 is returned to the original position, the cam accommodating portion 5 is moved away from the housing 15 (the gear cover 2) by the spring 10. Therefore, the projections 31 on the cam 27 move into the recesses 32 in the cam accommodating portion 5 so that the cam 27 and the cam accommodating portion 5 engage each other again. Subsequently, the button 17 is released from the depression force. As previously mentioned, the stroke of reciprocation of the plunger 11 is equal to the distance between the center of rotation of the gear 4 (that is, the axis of the gear 4) and the center of the cam pin 30. In the case where the ball 34 fits into the second groove 36, the stroke of the plunger 11 is relatively small.

As understood from the previous description, the steps to change the stroke of reciprocation of the plunger 11 can be implemented without rotating the connector 45 relative to the plunger 11. Accordingly, the longitudinal dimension L of the connector 45 can be approximately equal to the diameter "b" of the outer circle "a" formed by the cam pin 30. Thus, the connector 45 can be small in size. In addition, the connector 45 can be light in weight. Also, the counter racks 49 can be light in weight. Therefore, the reciprocating tool of FIGS. 6–12 can be small in size and light in weight.

As understood from the previous description, the steps to change the stroke of reciprocation of the plunger 11 are simple and easy. In addition, the suppression or prevention of unwanted axial vibration of the plunger 11 by the counter racks 49 can be adequately maintained even when the stroke of reciprocation of the plunger 11 is changed.

Second Embodiment

Figure 13:
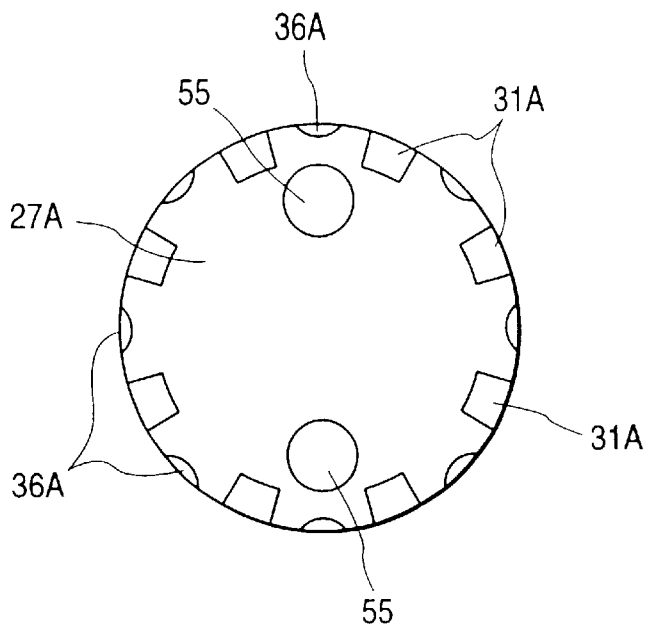
FIG. 13 is a side view of a cam in a second embodiment of this invention.

FIG. 13 shows a portion of a second embodiment of this invention which is similar to the first embodiment thereof except for design changes indicated hereinafter.

With reference to FIG. 13, the second embodiment of this invention includes a cam 27A instead of the cam 27 (see FIG. 10). The cam 27A has eight grooves 36A spaced at equal angular intervals. Under normal conditions, the ball 34 (see FIG. 6) fits into one of the grooves 36A. The stroke of reciprocation of the plunger 11 (see FIG. 6) depends on which of the grooves 36A the ball 34 fits into. The stroke of reciprocation of the plunger 11 can be changed among five different values.

The cam 27A has eight axial projections 31A spaced at equal angular intervals. Under normal conditions, the projections 31A fit into corresponding recesses in the cam accommodating portion 5 (see FIG. 6) respectively.

Third Embodiment

A third embodiment of this invention is similar to the first embodiment thereof except for design changes indicated hereinafter.

Figure 14:
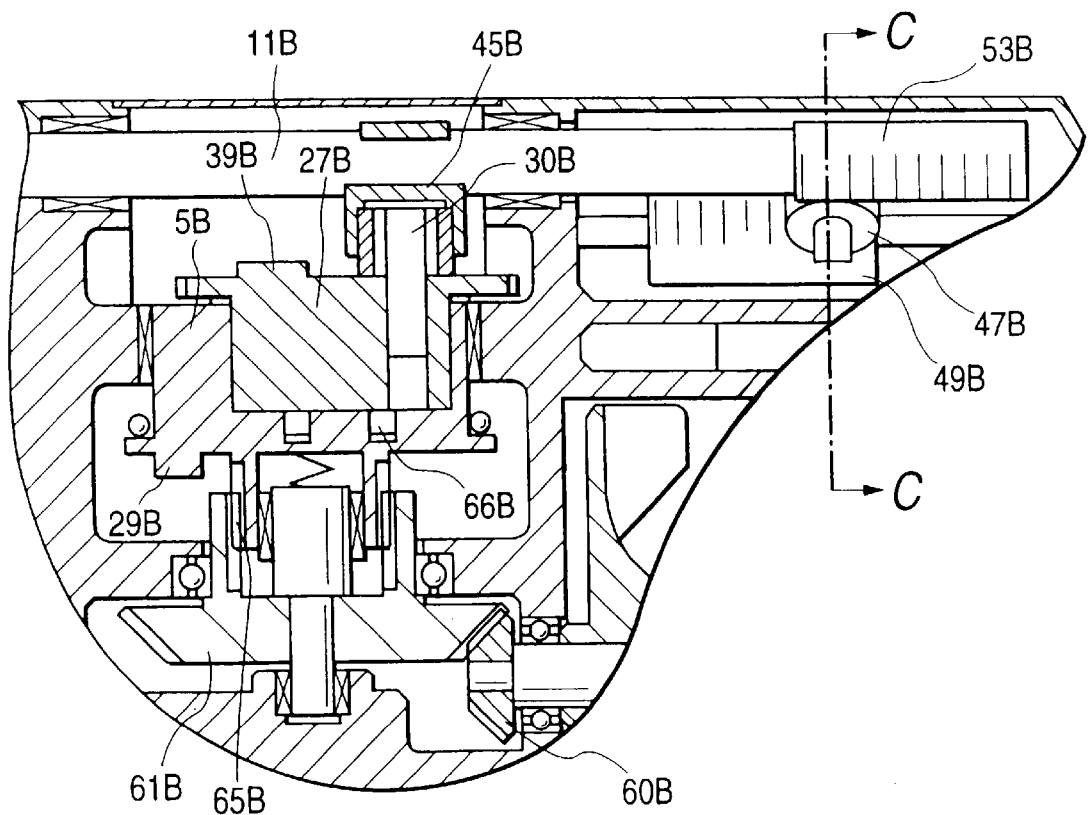
FIG. 14 is a sectional view of a portion of a reciprocating tool according to a third embodiment of this invention.
Figure 15:
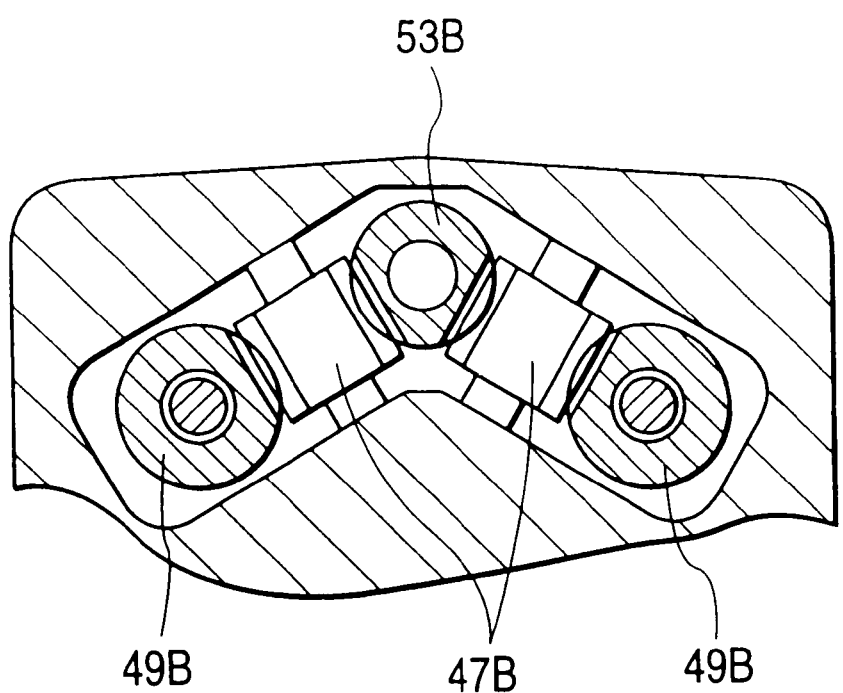
FIG. 15 is a sectional view taken along the line C—C in FIG. 14.

FIGS. 14 and 15 show a reciprocating tool according to the third embodiment of this invention. The reciprocating tool of FIGS. 14 and 15 is designed as a saber saw. With reference to FIGS. 14 and 15, the reciprocating tool includes a bevel pinion 60B and a bevel gear 61B which mesh with each other. The drive force generated by a motor (not shown) is transmitted via the bevel pinion 60B to the bevel gear 61B. A cam accommodating portion (a cam holding portion) 5B is connected to the bevel gear 61B via a spline coupling or a key coupling 65B. The cam accommodating portion 5B rotates about its axis together with the bevel gear 61B. The cam accommodating portion 5B can axially slide relative to the bevel gear 61B. The cam accommodating portion 5B has an eccentric recess into which a cam 27B slidably extends.

Axially-extending connection pins 66B are fixedly mounted on the cam 27B. Under normal conditions, the connection pins 66B fit into respective holes in the cam accommodating portion 5B so that the cam 27B and the cam accommodating portion 5B are in engagement with each other. In the case where the cam 27B and the cam accommodating portion 5B remain in engagement with each other, the cam 27B rotates together with the cam accommodating portion 5B.

A cam pin 30B fixed to the cam 27B projects therefrom. The cam pin 30B engages a connector 45B via a bearing (no reference character). The connector 45B is fixed to a plunger 11B. The connector 45B acts as a cam follower for the cam pin 30B. As the cam pin 30B rotates together with the cam 27B, the plunger 11B reciprocates along its longitudinal axis. The plunger 11B is provided with a rack 53B. Two counter racks 49B are connected with the rack 53B via pinions 47B respectively. The counter racks 49B move along a direction opposite to the direction of movement of the plunger 11B. The counter racks 49B suppress or prevent unwanted axial vibration of the plunger 11B during normal reciprocation of the plunger 11B. The counter racks 49B are arranged in a V-shaped configuration in conjunction with the rack 53B to provide a small width of the body of the reciprocating tool. A weight 39B is provided on the cam 27B. A weight 29B is provided on the cam accommodating portion 5B. The weights 29B and 39B suppress or prevent unwanted vibration of the cam 27B and the cam accommodating portion 5B in the direction of rotation thereof.

The stroke of rotation of the plunger 11B can be changed in a way including a step of moving the cam accommodating portion 5B away from the cam 27B by pulling the lever 14 (see FIG. 7).

Fourth Embodiment

Figure 16:
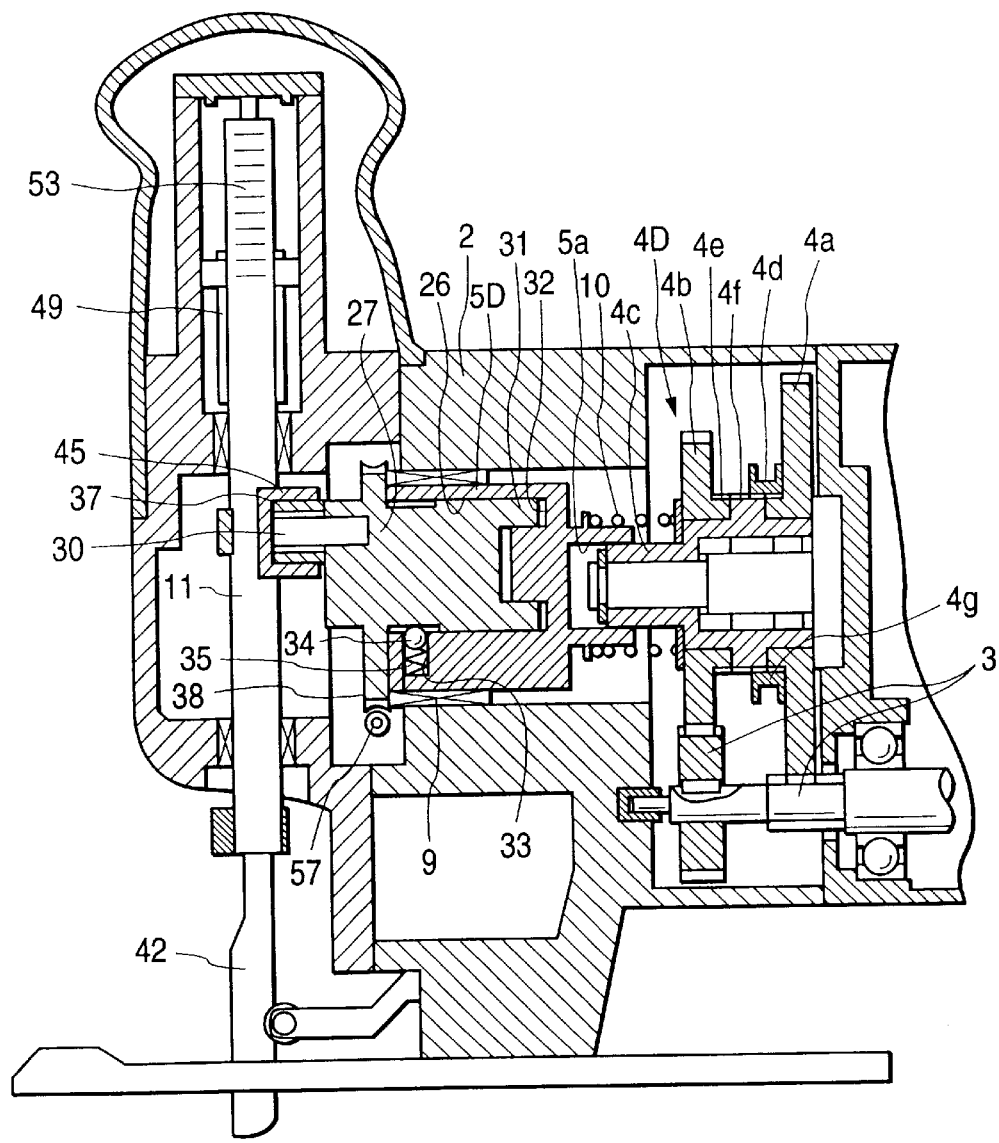
FIG. 16 is a sectional view of a reciprocating tool according to a fourth embodiment of this invention.

FIG. 16 shows a fourth embodiment of this invention which is similar to the first embodiment thereof except for design changes indicated hereinafter.

With reference to FIG. 16, the fourth embodiment of this invention includes a gear assembly 4D and a cam accommodating portion (a cam holding portion) 5D instead of the gear 4 and the cam accommodating portion 5 (see FIG. 6) respectively. The gear assembly 4D and the cam accommodating portion 5D are separate from each other.

The gear assembly 4D includes a normal-speed gear 4a and a high-speed gear 4b. The normal-speed gear 4a and the high-speed gear 4b are connected with an armature pinion 3. Accordingly, the normal-speed gear 4a and the high-speed gear 4b rotate as the armature pinion 3 rotates. Either the normal-speed gear 4a or the high-speed gear 4b is connected with the cam accommodating portion 5D via a shaft gear 4c and a spline ring 4g.

An end of the shaft gear 4c which is closer to the cam accommodating portion 5D has a width-across-flat shape. This end of the shaft gear 4c fits into a width-across-flat groove 5a provided in an end surface of the cam accommodating portion 5D which faces the gear assembly 4D. Thereby, the shaft gear 4c is in engagement with the cam accommodating portion 5D. Thus, the cam accommodating portion 5D rotates about its axis together with the shaft gear 4c. The cam accommodating portion 5D can axially slide relative to the shaft gear 4c. The normal-speed gear 4a and the high-speed gear 4b are rotatably provided around the shaft gear 4c. The shaft gear 4c has a spline 4f located between the normal-speed gear 4a and the high-speed gear 4b. The normal-speed gear 4a has a spline 4d. The high-speed gear 4b has a spline 4e. The splines 4d, 4e, and 4f are equal in outside diameter. The spline 4d, the spline 4f, and the spline 4e are arranged in that order along a direction parallel to the axis of the gear assembly 4D.

The spline ring 4g is contained in the gear assembly 4D. The spline ring 4g has an inside diameter equal to the outside diameter of the splines 4d, 4e, and 4f. The width (the axial dimension) of the spline ring 4g is greater than the widths (the axial dimensions) of the splines 4d and 4e. The spline ring 4g can slide axially relative to the shaft gear 4c. The spline ring 4g couples the spline 4f with either the spline 4d or the spline 4e in accordance with its axial position relative to the shaft gear 4c. Specifically, when the spline ring 4g is in a rightmost position as viewed in FIG. 16, the spline 4f is connected to the spline 4d via the spline ring 4g so that the shaft gear 4c is coupled with the armature pinion 3 via the normal-speed gear 4a. In this case, the speed of rotation of the shaft gear 4c is set to a normal value. When the spline ring 4g is in a leftmost position as viewed in FIG. 16, the spline 4f is connected to the spline 4e via the spline ring 4g so that the shaft gear 4c is coupled with the armature pinion 3 via the high-speed gear 4b. In this case, the speed of rotation of the shaft gear 4c is set to a value higher than the normal value.

In this way, the the speed of rotation of the shaft gear 4c, that is, the speed of rotation of the cam accommodating portion 5D, can be controlled by axially sliding the spline ring 4g. When the shaft gear 4c is coupled with the armature pinion 3 via the normal-speed gear 4a, the cam accommodating portion 5D rotates at a normal speed. When the shaft gear 4c is coupled with the armature pinion 3 via the high-speed gear 4b, the cam accommodating portion 5D rotates at a high speed.

Preferably, the spline ring 4g can be accessed from an external. For example, the spline ring 4g is connected with a lever having a button. In this case, the spline ring 4g can be axially slid by actuating the button.

The cam accommodating portion 5D is supported within a gear cover 2 by a bearing 9. The cam accommodating portion 5D can rotate about its axis. In addition, the cam accommodating portion 5D can slide along the axial direction. The cam accommodating portion 5D has an eccentric recess or an eccentric hole 26 into which a cam 27 slidably extends. The cam accommodating portion 5D has recesses 32 at a bottom of the eccentric recess 26. The cam 27 has axial projections 31 which fit into the recesses 32 respectively under normal conditions. Thus, the cam 27 and the cam accommodating portion 5D can be in engagement with each other. When the cam 27 and the cam accommodating portion 5D are in engagement with each other, the cam 27 rotates together with the cam accommodating portion 5D. A spring 10 provided between the cam accommodating portion 5D and the gear assembly 4D urges the cam accommodating portion 5D in a direction away from the gear assembly 4D so that the projections 31 on the cam 27 will fit into the respective recesses 32 in the cam accommodating portion 5D under normal conditions.

A thick-wall part of the cam accommodating portion 5D which is near the eccentric recess 26 has a hole 33 in which at least a part of a ball 34 is located. A compression spring 35 is disposed in the hole 33. The spring 35 urges the ball 34 toward the eccentric recess 26. An outer circumferential surface of the cam 27 has two grooves 36 at diametrically-opposed positions (that is, positions symmetrical with respect to the axis of the cam 27) respectively. Each of the grooves 36 has a shape corresponding to a part of a sphere. Under normal conditions, the ball 34 fits into one of the grooves 36, thereby preventing the cam 27 from rotating relative to the cam accommodating portion 5D even in the case where the cam 27 and the cam accommodating portion 5D are out of engagement via the projections 31 and the recesses 32.

A lever (not shown and corresponding to the lever 14 in FIG. 14) having a button can engage the cam accommodating portion 5D. When the button is actuated to move the lever, the cam accommodating portion 5D is slid in the axial direction toward the gear assembly 4D against the force of the spring 10. As the cam accommodating portion 5D is slid toward the gear assembly 4D, the projections 31 move out of the recesses 32 so that the related engagement between the cam 27 and the cam accommodating portion 5D is canceled.

A part of the cam 27 which projects from the cam accommodating portion 5D has teeth 38 extending radially outward. A manually-operated rotatable gear 57 is supported on an upper cover. The gear 57 can be moved into and out of mesh with the teeth 38 on the cam 27. Normally, the gear 57 is separate from the teeth 38.

The stroke of reciprocation of a plunger 11 is determined by which of the grooves 36 the ball 34 fits into. Therefore, the stroke of reciprocation of the plunger 11 can be varied by changing the groove 36 into which the ball 34 fits. The groove 36 into which the ball 34 fits can be changed as follows. Under conditions where the cam 27 and the cam accommodating portion 5D remain out of engagement via the projections 31 and the recesses 32, the gear 57 is moved into mesh with the teeth 38 on the cam 27. The gear 57 is rotated while the gear 57 and the teeth 38 are held in mesh. The teeth 38 and the cam 27 rotate relative to the cam accommodating portion 5D in accordance with the rotation of the gear 57. As the cam 27 rotates relative to the cam accommodating portion 5D through an angle of 180 degrees, the ball 34 moves out of first one of the grooves 36 and then falls into second one of the grooves 36. Then, the cam accommodating portion 5D and the cam 27 are moved into engagement via the projections 31 and the recesses 32.

Accordingly, the stroke of reciprocation of the plunger 11 can be changed between a great value and a small value. A mean speed of reciprocation of the plunger 11 drops as its stroke deceases. Preferably, such a drop in mean speed of reciprocation is compensated for as follows. In the case where the stroke of the plunger 11 is set to the small value, the spline ring 4g in the gear assembly 4D is placed so that the shaft gear 4c is coupled with the high-speed gear 4b via the spline ring 4g. In this case, the cam accommodating portion 5D and the cam 27 can rotate at a high speed canceling the drop in mean speed of reciprocation of the plunger 11. In the case where the stroke of the plunger 11 is set to the great value, the spline ring 4g is placed so that the shaft gear 4c is coupled with the normal-speed gear 4a via the spline ring 4g. In this case, the cam accommodating portion 5D and the cam 27 can rotate at a normal speed causing a suitable mean speed of reciprocation of the plunger 11. Preferably, the relation between the normal-speed gear 4a and the high-speed gear 4b is chosen so that the mean speed of reciprocation of the plunger 11 can be substantially independent of whether the stroke of the plunger 11 is set to the great value or the small value.

As previously mentioned, it is possible to compensate for a drop in mean speed of reciprocation of the plunger 11 which would occur when the stroke of the plunger 11 is set to the small value.

It should be noted that three or more grooves 36 may be provided. In this case, the stroke of reciprocation of the plunger 11 can be changed among three or more different values.

What is claimed is:

1. A reciprocating tool comprising:
   a rotatable drive gear;
   a pin connected to the drive gear and being eccentric with respect to an axis of rotation of the drive gear;
   a plunger extending perpendicular to the pin and being movable upward and downward;
   a connector engaging the plunger and the pin;
   a cam provided with the pin at an eccentric position;
   a cam holding member holding the cam at an eccentric position and being connected to the drive gear for rotation responsive to rotation of the drive gear;
   a engagement portion provided on the cam; and
   a second engagement portion provided on the cam holding member and being engageable with the first engagement portion;
   first means for cancelling engagement between the first engagement portion and the second engagement portion to allow rotation of the cam relative to the cam holding member, and
   for establishing engagement between the first engagement portion and the second engagement portion while holding the cam at an angular position which occurs as a result of the rotation of the cam.

2. A reciprocating tool as recited in claim 1, wherein the cam holding member having an eccentric recess accommodating at least part of the cam, and the cam holding member and the drive gear are integral with each other.

3. A reciprocating tool as recited in claim 1, wherein the first engagement portion includes a projection, and the second engagement portion includes a recess into which the projection is movable.

4. A reciprocating tool as recited in claim 1, wherein the first engagement portion includes a plurality of first sub engagement portions spaced at equal angular intervals, and the second engagement portion includes a plurality of second sub engagement portions spaced at equal angular intervals and being engageable with the first sub engagement portions respectively.

5. A reciprocating tool as recited in claim 1, further comprising a weight provided on the cam and having a mass substantially equal to that of the pin, and a position of the weight and a position of the pin are symmetrical with respect to a central axis of the cam.

6. A reciprocating tool as recited in claim 1, further comprising a counter rack substantially equal in mass to the plunger, and means for moving the counter rack in a direction opposite to a direction of movement of the plunger.

7. A reciprocating tool as recited in claim 1, wherein the drive gear includes a normal-speed gear and a high-speed gear, and further comprising means for selectively connecting the cam holding member with one of the normal-speed gear and the high-speed gear.

8. A reciprocating tool as recited in claim 7, wherein the plunger reciprocates as the drive gear rotates in cases where the first engagement portion and the second engagement portion are in engagement with each other, and a stroke of the plunger depends on an angular position of the cam relative to the cam holding member, and wherein the cam holding member is connected with the high-speed gear when the stroke of the plunger is set to a first value, and is connected with the normal-speed gear when the stroke of the plunger is set to a second value greater than the first value.

* * * * *